(12) United States Patent
Kosmowski et al.

(10) Patent No.: US 7,889,322 B2
(45) Date of Patent: Feb. 15, 2011

(54) SPECIMEN INSPECTION STAGE IMPLEMENTED WITH PROCESSING STAGE COUPLING MECHANISM

(75) Inventors: Mark T. Kosmowski, Beaverton, OR (US); Robert Ferguson, Beaverton, OR (US); Jeremy Willey, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 950 days.

(21) Appl. No.: 11/747,118

(22) Filed: May 10, 2007

(65) Prior Publication Data

US 2008/0198373 A1 Aug. 21, 2008

Related U.S. Application Data

(63) Continuation-in-part of application No. 11/676,937, filed on Feb. 20, 2007, now Pat. No. 7,760,331.

(60) Provisional application No. 60/890,807, filed on Feb. 20, 2007.

(51) Int. Cl.
*G03B 27/58* (2006.01)
(52) U.S. Cl. .......................................... 355/72; 355/53
(58) Field of Classification Search .................... 355/53, 355/72; 356/244
See application file for complete search history.

(56) References Cited

U.S. PATENT DOCUMENTS

| | | | |
|---|---|---|---|
| 4,761,876 A | 8/1988 | Kosmowski | |
| 4,869,626 A | 9/1989 | Kosmowski | |
| 4,922,603 A | 5/1990 | Kosmowski | |
| 5,699,621 A | 12/1997 | Trumper et al. | |
| 6,252,705 B1 | 6/2001 | Lo et al. | |
| 6,906,546 B2 | 6/2005 | Tanioka et al. | |
| 7,051,449 B2 | 5/2006 | Eichner et al. | |
| 7,434,322 B2 | 10/2008 | Walser et al. | |
| 7,464,478 B2 | 12/2008 | Adrian | |
| 7,478,481 B2 | 1/2009 | Reynaerts et al. | |
| 7,603,785 B2 | 10/2009 | Kosmowski | |
| 7,760,331 B2 | 7/2010 | Kosmowski | |
| 2001/0029675 A1 | 10/2001 | Webb | |
| 2007/0263191 A1 | 11/2007 | Shibazaki | |
| 2008/0094593 A1 | 4/2008 | Shibazaki | |
| 2008/0209746 A1 | 9/2008 | Tan et al. | |
| 2009/0122293 A1 | 5/2009 | Shibazaki | |

FOREIGN PATENT DOCUMENTS

JP 2000-074850 A 3/2000

*Primary Examiner*—Edward J Glick
*Assistant Examiner*—Mesfin T Asfaw
(74) *Attorney, Agent, or Firm*—Stoel Rives LLP

(57) ABSTRACT

A specimen inspection stage implemented with a processing stage coupling mechanism provides a capability to conduct with maximum efficiency post-processing specimen inspections on-board a processing platform. Heavy inspection equipment is mounted on a specimen inspection stage that is separate from a processing stage. In a preferred embodiment, the processing stage moves in response to an applied motive force and performs laser-based processing operations on a specimen. While laser processing is ongoing, the specimen inspection stage remains parked in its home position. When it is time for post-processing inspection, a stage coupling and decoupling mechanism couples together the specimen inspection stage and the processing stage, which transports the specimen inspection stage to and from the specimen position.

5 Claims, 9 Drawing Sheets

SPECIMEN INSPECTION STAGE IMPLEMENTED WITH PROCESSING STAGE COUPLING MECHANISM

RELATED APPLICATIONS

This is a continuation-in-part of U.S. patent application Ser. No. 11/676,937, filed Feb. 20, 2007, now U.S. Pat. No. 7,760,331, and claims benefit of U.S. Provisional Patent Application No. 60/890,807, filed Feb. 20, 2007.

COPYRIGHT NOTICE

©2007 Electro Scientific Industries, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

The present disclosure relates to specimen processing systems and, in particular, to achieving operational efficiency in performing specimen processing and inspection.

BACKGROUND INFORMATION

Wafer transport systems configured for use in semiconductor wafer-level processing typically include a stage having a chuck that secures the wafer for processing. Sometimes the stage is stationary, and sometimes it is moveable. Some applications require that the stage move linearly in one, two, or three Cartesian dimensions, with or without rotation. The speed of the stage motion can dictate the throughput of the entire wafer processing platform if a significant amount of the total process time is spent aligning and transporting the wafer.

Some systems have the flexibility to move the processing and inspection devices to the wafer as well as move the wafer to the devices. This can eliminate wafer alignment steps and thereby save time. For applications including laser processing, a moveable optics assembly can be mounted above the wafer surface, thereby minimizing the wafer transport distances required. The chuck holding the wafer, or specimen, to be processed may be mounted to a major axis stage for movement in the primary direction of stage motion, a minor axis stage for movement in a direction perpendicular to the primary direction of stage motion, or in a stationary position below the major and minor axes. The major axis stage may support the minor axis stage, or they may be independent of each other.

Stage design of such optical systems is becoming more critical as electrical circuit dimensions shrink. One stage design consideration is the impact of process quality stemming from vibrational and thermal stability of the wafer chuck and optics assembly. In the case in which the laser beam position is continually adjusted, state-of-the-art structures supporting the laser assembly are too flexible to maintain the required level of precision. Moreover, as circuit dimensions shrink, particle contamination becomes of greater concern.

In semiconductor wafer fabrication, many wafer processing operations are followed by an inspection to ensure that an operation was successful before moving a wafer on to a next processing step. The inspection may be conducted with use of a separate piece of equipment, usually a powerful optical microscope or an electron microscope. Or, the inspection equipment may be directly built into a processing system platform, eliminating overhead associated with delivery of wafers to an additional station. Transporting a heavy processing or inspection device unnecessarily is also undesirable, because the accuracy and stability of a moving structure is optimized when its mass is low. In addition, thermal dissipation increases with motor size and, therefore, with payload mass.

SUMMARY OF THE DISCLOSURE

The present disclosure relates to a laser processing system in which a positioning system is designed to support a specimen undergoing one or more processing operations. In one embodiment, for example, the positioning system is used in "scribing and dicing" finished electronic devices patterned on semiconductor wafers. Wafer scribing entails a laser beam traversing boundaries between integrated circuit chips patterned on a silicon wafer and ablating upper dielectric and metal layers along the boundaries. Wafer dicing entails a laser beam traversing boundaries between integrated circuit chips patterned on a silicon wafer and separating adjacent chips from each other.

A feature of a preferred embodiment of the positioning system is a rigid stone slab substrate that provides a vibration-free platform on which to mount processing equipment and a specimen stage. This stable platform also provides an attractive foundation for integrating post-processing inspection equipment.

A "split axis stage" architecture is implemented in a preferred embodiment, supporting a laser optics assembly and a workpiece having a surface on which a laser beam is incident for laser processing. The multiple stage positioning system is capable of vibrationally and thermally stable material transport at high speed and rates of acceleration. The split axis design decouples driven stage motion along two perpendicular axes lying in separate, parallel planes. In a preferred embodiment motion in the horizontal plane is split between a specimen (major axis or lower) stage and a scan optics assembly (minor axis or upper) stage that move orthogonally relative to each other.

The dimensionally stable substrate, or slab, is used as the base for the lower and upper stages. The massive and structurally stiff substrate isolates and stabilizes the motions of the laser optics assembly and the specimen, absorbs vibrations, and allows for smoother acceleration and deceleration because the supporting structure is inherently rigid. The substrate also provides thermal stability by acting as a heat sink. Moreover, because it is designed in a compact configuration, the system is composed of less material and is, therefore, less susceptible to expansion when it undergoes heating. The substrate is precisely cut ("lapped") such that portions of its upper and lower stage surfaces are flat and parallel to each other. The slab and the stages are preferably fabricated from materials with similar coefficients of thermal expansion to cause the system to advantageously react to temperature changes in a coherent fashion.

In a preferred embodiment, a lower guide track assembly that guides a lower stage carrying a specimen-holding chuck is coupled to a flat lower surface of the substrate. An upper guide track assembly that guides an upper stage carrying a laser beam focal region control subsystem is coupled to a flat upper surface of the substrate. The specimen stage carrying the wafer and the process stage carrying the optics glide along low-friction or frictionless guide rails. Linear motors positioned along adjacent rails of the guide track assemblies control the movements of the lower and upper stages. A laser beam focal region control subsystem is supported above the lower stage and includes a vertically adjustable optics assembly positioned within a rigid air bearing sleeve mounted to the upper stage by a support structure. An oval slot cut out of the middle of the substrate exposes the specimen below to the laser beam and allows for vertical motion of the laser optics assembly through the substrate. Otherwise, the specimen is shielded by the substrate from particles generated by overhead motion, except for the localized region undergoing laser processing.

When laser processing of the specimen is complete, the result is inspected, typically under a high-power microscope outfitted with a camera. On-board inspections maximize efficiency of both production and process development activities. Furthermore, there is a significant stability advantage in supporting the inspection equipment, which is made massive by heavy zoom lenses, on the same rigid substrate that supports the lighter weight processing equipment. Instead of mounting heavy inspection equipment on the processing stage along with the optics assembly, the inspection equipment is mounted on a third, separate, non-motorized or passive specimen inspection stage. While laser processing is ongoing, the specimen inspection stage remains parked in its home position, located at one end of the guide rail. When it is time for the post-processing inspection, the processing stage, which is equipped with a stage coupling and decoupling mechanism, is used to transport the specimen inspection stage to and from the wafer position.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
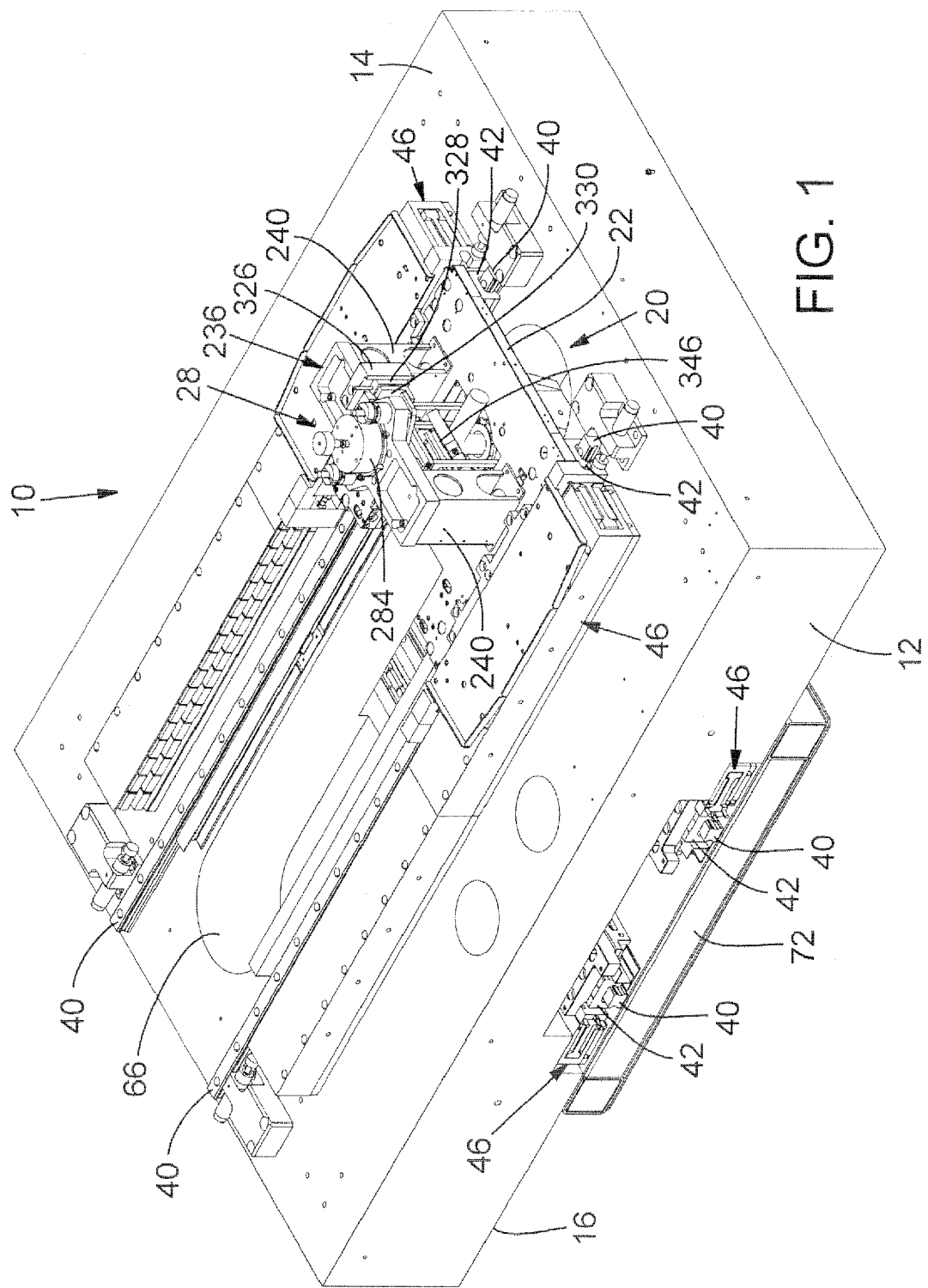
FIG. 1 is an isometric view of a decoupled, multiple stage positioning system.
Figure 2:
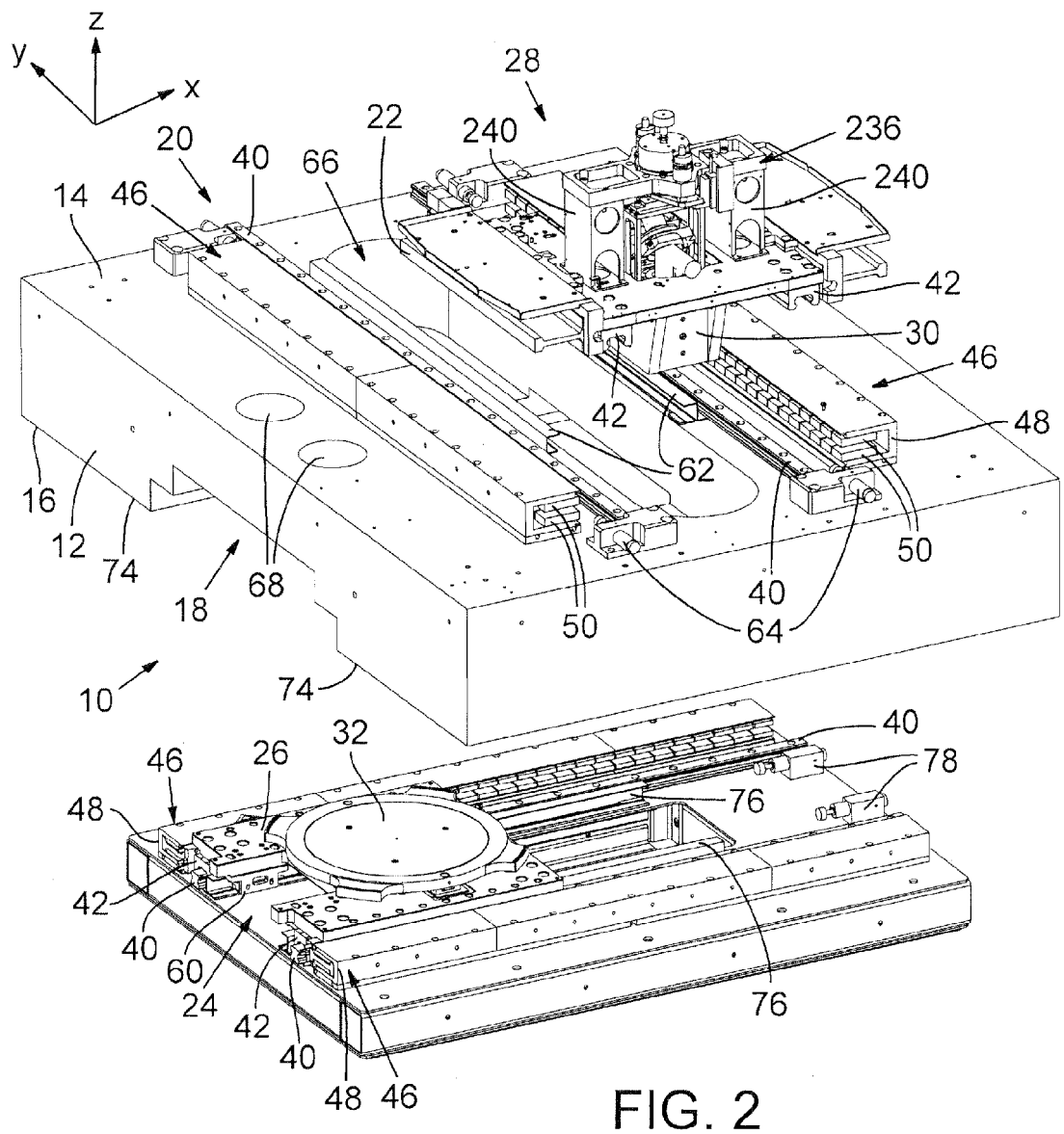
FIG. 2 is a partly exploded isometric view of the positioning system of FIG. 1, showing upper and lower stages that, when the system is assembled, are mounted to a dimensionally stable substrate such as a stone slab.

FIGS. 1 and 2 show a decoupled, multiple stage positioning system 10, which, in a preferred embodiment, supports components of a laser processing system through which a laser beam propagates for incidence on a target specimen. Positioning system 10 includes a dimensionally stable substrate 12 made of a stone slab, preferably formed of granite, or a slab of ceramic material, cast iron, or polymer composite material such as Anocast™. Substrate 12 has a first or upper flat major surface 14 and a second or lower flat major surface 16 that has a stepped recess 18. Major surfaces 14 and 16 include surface portions that are plane parallel to each other and conditioned to exhibit flatness and parallelism within about a ten micron tolerance.

A surface portion of upper major surface 14 and a first guide track assembly 20 are coupled to guide movement of a laser optics assembly stage 22 along a first axis, and a surface portion of lower major surface 16 and a second guide track assembly 24 are coupled to guide movement of a specimen stage 26 along a second axis that is transverse to the first axis. Optics assembly stage 22 supports a laser beam focal region control subsystem 28, which includes a scan lens 30 that depends downwardly below lower major surface 16 of substrate 12. Specimen stage 26 supports a specimen-holding chuck 32. The guided motions of stages 22 and 26 move scan lens 30 relative to laser beam processing locations on a surface of a specimen (not shown) held by chuck 32.

In a preferred implementation, substrate 12 is set in place so that major surfaces 14 and 16 define spaced-apart horizontal planes and guide track assemblies 20 and 24 are positioned so that the first and second axes are perpendicular to each other and thereby define respective Y- and X-axes. This split axis architecture decouples motion along the X- and Y-axes, simplifying control of positioning the laser beam and chuck 32, with fewer degrees of freedom allowed.

Figure 3:
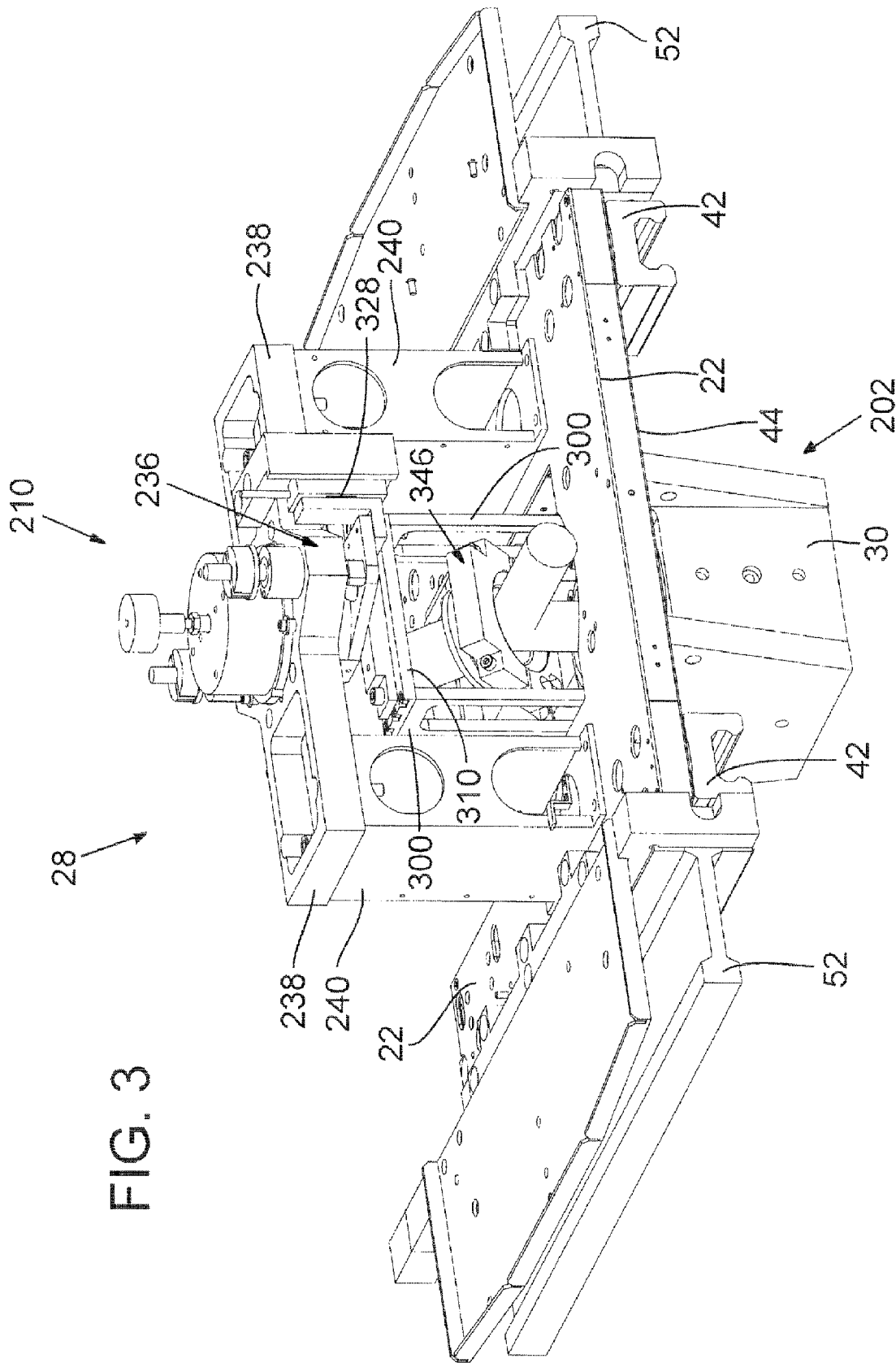
FIG. 3 is an isometric view of the positioning system of FIG. 1, showing the upper stage supporting a scan lens and upper stage drive components.

FIG. 3 shows in detail optics assembly stage 22, which operates with first guide track assembly 20 shown in FIG. 2. First guide track assembly 20 includes two spaced-apart guide rails 40 secured to support portions of upper major surface 14 and two U-shaped guide blocks 42 supported on a bottom surface 44 of optics assembly stage 22. Each one of guide blocks 42 fits over and slides along a corresponding one of rails 40 in response to an applied motive force. Each rail guide 40—guide block 42 pair of first guide track assembly 20 shown in FIG. 2 is a rolling element bearing assembly. A motor drive for optics assembly stage 22 includes a linear motor 46 that is mounted on upper major surface 14 and along the length of each guide rail 40. Linear motor 46 imparts the motive force to propel its corresponding guide block 42 for sliding movement along its corresponding guide rail 40. Each linear motor 46 includes a U-channel magnet track 48 that holds spaced-apart linear arrays of multiple magnets 50 arranged along the length of guide rail 40. A forcer coil assembly 52 positioned between the linear arrays of magnets 50 is connected to bottom surface 44 of optics assembly stage 22 and constitutes the movable member of linear motor 46 that moves optics assembly stage 22. A suitable linear motor 46 is a Model MTH480, available from Aerotech, Inc., Pittsburgh, Pa.

A pair of encoder heads 60 secured to bottom surface 44 of optics assembly stage 22 and positioned adjacent different ones of guide blocks 42 includes position sensors that measure yaw angle and distance traveled of optics assembly stage 22. Placement of the position sensors in proximity to guide rails 40, guide blocks 42, and linear motors 46 driving each of stages 22 and 26 ensures efficient, closed-loop feedback control with minimal resonance effects. A pair of stop members 62 limits the travel distance of guide blocks 42 in response to limit switches included in encoder heads 60 that are tripped by a magnet (not shown) attached to substrate 12. A pair of dashpots 64 dampen and stop the motion of optics assembly stage 22 to prevent it from overtravel movement off of guide rails 40.

An oval slot 66 formed in substrate 12 between and along the lengths of guide rails 40 provides an opening within which scan lens 30 can travel as optics assembly stage 22 moves along guide rails 40. A pair of through holes 68 formed in the region of stepped recess 18 in substrate 12 provides operator service access from upper surface 14 to encoder heads 60 to maintain their alignment.

Processing equipment mounted to optics assembly stage 22 in FIG. 3 comprising laser beam control subsystem 28 includes an air bearing assembly 202, a lens forcer assembly 210, and a yoke assembly 212. Elements of yoke assembly 212, forming a supporting structure for the processing equipment, and therefore prominently evident in FIGS. 1, 2, 3, 8, and 9, include a voice coil bridge 236, side members 238, uprights 240, yoke side plates 300, and a yoke mount 310. Visible components of the processing equipment thus supported include an encoder 328 and a beam deflection device 346. A detailed description of preferred optical processing equipment is set forth in copending U.S. patent application Ser. No. 11/676,937, of which the present patent application is a continuation-in-part.

Figure 4:
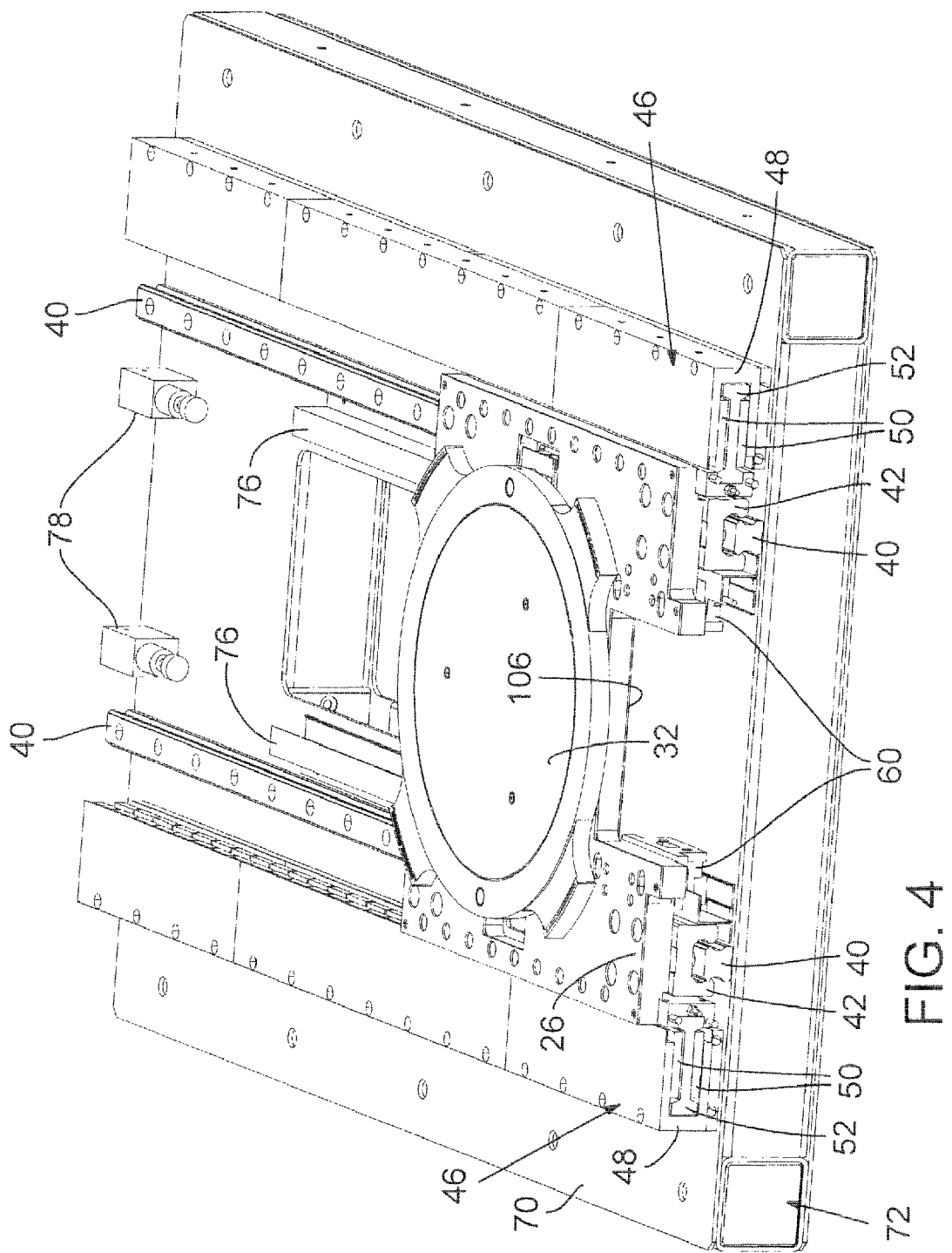
FIG. 4 is an isometric view of the positioning system of FIG. 1, showing the lower stage supporting a specimen-holding chuck and lower stage drive components.

FIG. 4 shows in detail specimen stage 26 in operative association with second guide track assembly 24 of FIG. 2. Second guide track assembly 24 includes guide rails, U-shaped guide blocks, linear motors, U-channel magnet tracks, magnets, forcer coil assemblies, and encoder heads that correspond to and are identified by the same reference numerals as those described above in connection with first guide track assembly 20. Linear motors 46 and the components of and components supported by second guide track assembly 24 are mounted on a surface 70 of a specimen stage bed 72.

The mechanical arrangement of stages 22 and 26 and motors 46 results in reduced pitch and roll of stages 22 and 26, and enhances accuracy of high velocity motion. Symmetric placement of motors 46 on opposite sides of stages 22 and 26 improves control of yaw. The placement of motors 46 along the sides of stages 22 and 26, as opposed to underneath them, minimizes thermal disturbance of critical components and position sensors.

Second guide track assembly 24 and specimen stage 26 supporting chuck 32 fits into and is secured within stepped recess 18. Surface 70 of specimen stage bed 72 is secured against a surface portion 74 of lower major surface 16 adjacent the wider, lower portion of stepped recess 18, and chuck 32 is positioned below the innermost portion of stepped recess 18 of lower major surface 16 and moves beneath it in response to the motive force imparted by linear motors 46 moving specimen stage 26 along second guide track assembly 24. A pair of stop members 76 limits the travel distance of guide blocks 42 in response to limit switches included in encoder heads 60 that are tripped by a magnet (not shown) attached to substrate 12. A pair of dashpots 78 dampen and stop the motion of specimen stage 26 to prevent it from overtravel movement off of guide rails 40.

Laser optics assembly stage 22 has an opening 200 that receives control subsystem 28, which includes an air bearing assembly 202 containing scan lens 30. Control subsystem 28 controls the axial position of a laser beam focal region formed by scan lens 30 as the laser beam propagates generally along a beam axis 206, which is the optic axis of scan lens 30, and through scan lens 30 for incidence on a work surface of a target specimen supported on specimen stage 26.

Figure 5:
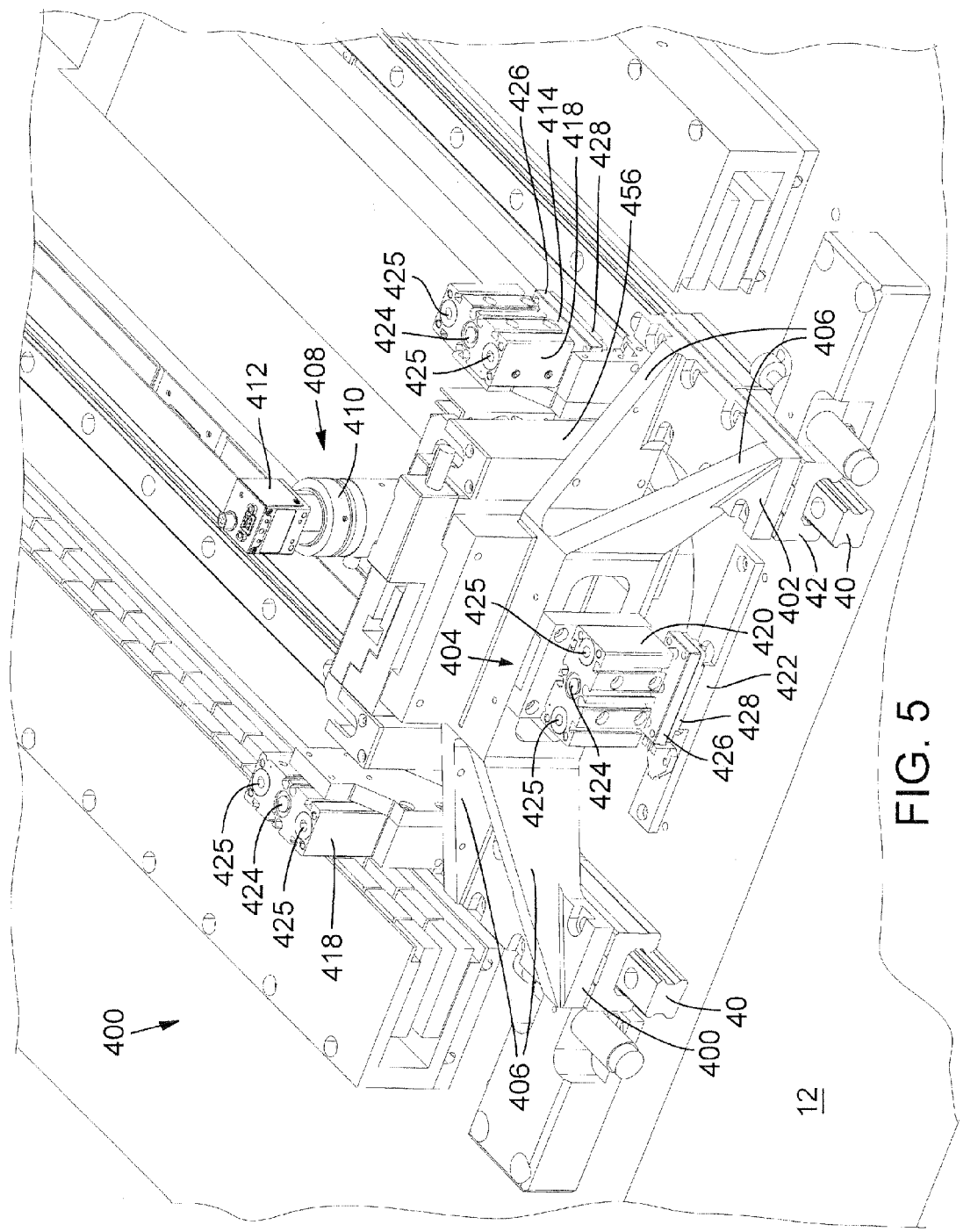
FIG. 5 is a fragmentary isometric view of the back end of a specimen inspection stage parked at its home position on the upper surface of a substrate slab.
Figure 6:
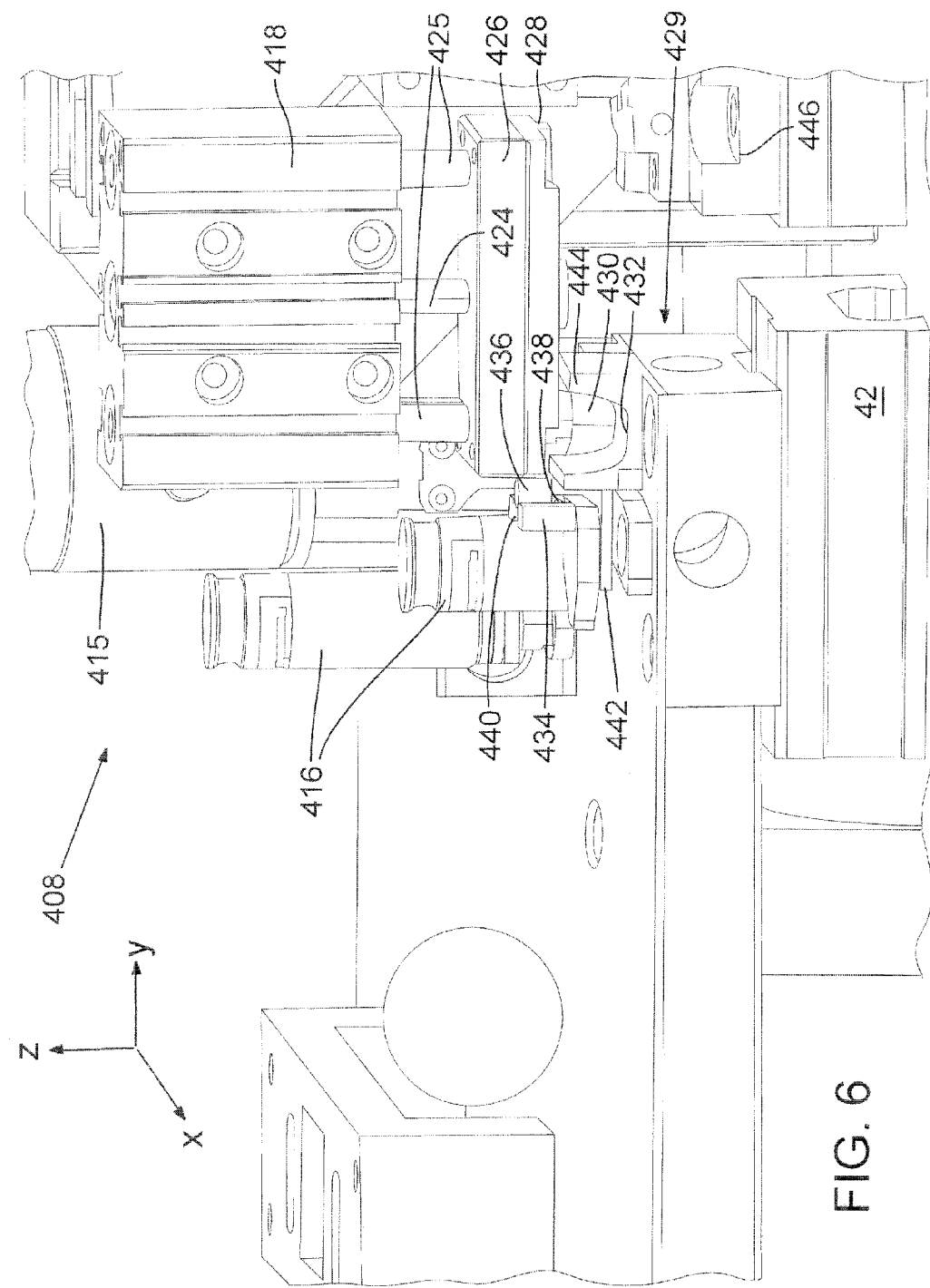
FIG. 6 is an enlarged fragmentary isometric view of a coupling mechanism joining the specimen inspection stage with a specimen processing stage.

The following description is directed to a specimen inspection stage and stage-coupling apparatus shown in FIGS. 5-9. The inspection equipment along with its stage is an optional sub-assembly that can be included in, but is not required by, the overall wafer processing system. FIG. 5 shows the back end of a preferred specimen inspection stage 400 to which inspection equipment and three coupling devices are mounted. Specimen inspection stage 400 rests parked at its home position located at the end of its travel along guide rails 40, at the edge of substrate 12. Specimen inspection stage 400 includes a monolithic aluminum carriage 404 that has four buttresses 406 forming a support structure to stabilize inspection equipment 408 being transported. Inspection equipment 408 includes a microscope 410 and a specialized camera 412 mounted at the upper end of a microscope column 414. In this embodiment, microscope 410 includes a 6.5× ultra zoom lens 415 and two objective lenses 416 with motorized zoom and focus adjustment control (FIG. 6). A suitable ultra-zoom lens 415 and suitable objective lenses 416 are, respectively, Part Nos. 1-62638 and 1-60228, both available from Navitar, Inc., Rochester, N.Y. A suitable digital microscope camera 412 is a Model No. FLEA-HICOL-CS, available from Point Grey Research, Vancouver, British Columbia.

Figure 8:
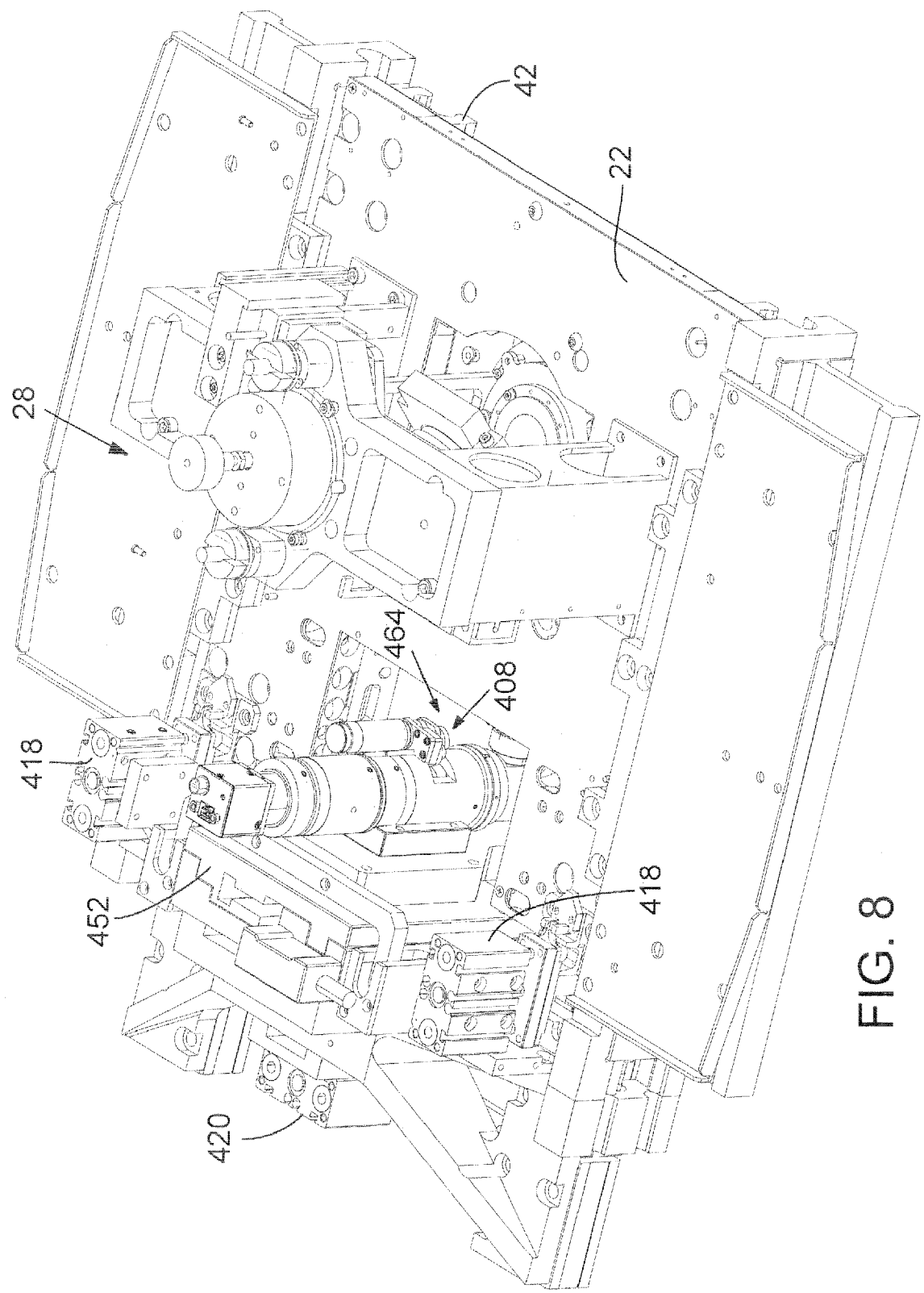
FIG. 8 is an isometric view of the specimen inspection stage coupled to the specimen process stage.

Three guided cylinder blocks are attached to specimen inspection stage 400, and they include two guided cylinder blocks 418 positioned on either side, and a guided cylinder block 420 positioned at the rear, of specimen inspection stage 400. Guided cylinder block 420, located at the rear, locks specimen inspection stage 400 into its home position via a V-groove mount 422, which is bolted to the surface of substrate 12. Guided cylinder blocks 418, located at the sides of specimen inspection stage 400, attach inspection stage 400 to a specimen processing and transporting stage, which, in this embodiment, is optical assembly stage 22 (FIG. 8). Suitable guided cylinder blocks 418 and 420 are each a Part No. SGDAQ-12X20 ZE 155A1, available from Koganei Corporation, Kalamazoo, Mich. Each of guided cylinder blocks 418 and 420 houses a central pneumatic cylinder 424 and two guide rods 425 fitted in guide bushing assemblies. Pneumatic cylinder 424 and guide rods 425 extend and retract as a unit into and out of the housing, along the z-axis. Pneumatic cylinder 424 is attached to a lower actuation plate 426, the underside of which is fitted with an adaptor 428.

FIG. 6 presents an enlarged view of guided cylinder blocks 418, each of which functions as a component of a coupling device 429 that releasably couples inspection stage 400 to optical assembly stage 22. Each coupling device 429 employs a kinematic mount to ensure repeatable positioning. Adaptor 428 bonds actuation plate 426 to a hemispherical coupler 430, which fits snugly into V-groove 432 when cylinders 424 are lowered. The vertical cylinder position is sensed by a photodetector 434 when a flag 436 that extends along the y-axis intercepts a light beam (not shown) that propagates along the x-axis, as defined by the coordinate system in the diagram. The light beam propagates from a light source 438 mounted inside the front of photodetector 434 to a sensor 440 mounted inside the back of photodetector 434. Interruption of the light beam by flag 436 indicates that specimen inspection stage 400 is coupled to optical assembly stage 22. A flange 442 extending from a V-groove member 444 is bolted to, and thereby causes specimen inspection stage 400 to move in response to movement of, optical assembly stage 22 when they are coupled. When coupling is complete, U-shaped guide block 42 associated with optical assembly stage 22 is positioned adjacent to U-shaped guide block 42 associated with specimen inspection stage 400, so that both stages glide together along fixed guide rail 40. An L-shaped bracket 446 bolted to stage 400 opposite adaptor 428 serves as a mounting surface for guided cylinder blocks 418.

Figure 7:
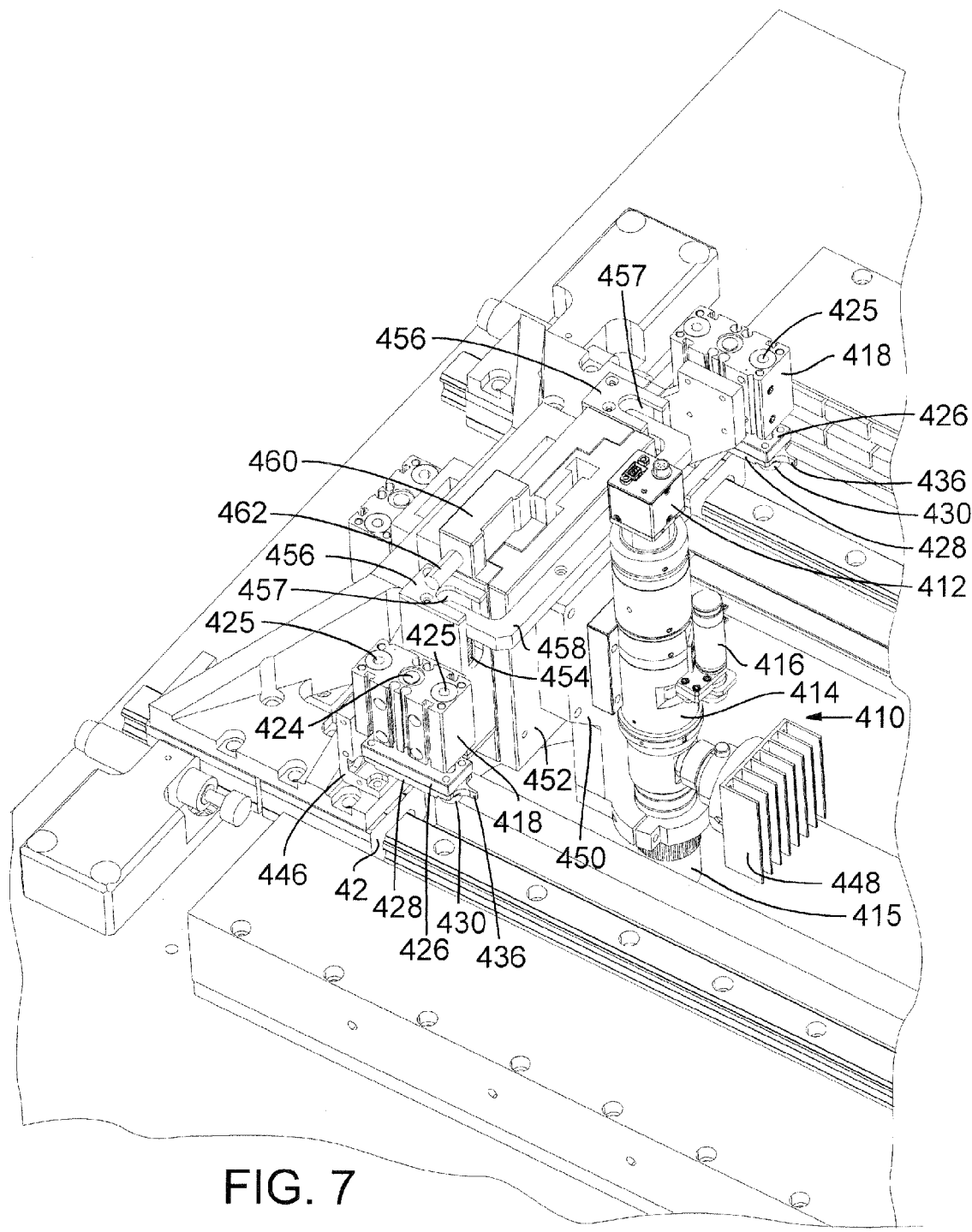
FIG. 7 is a fragmentary isometric view of the top surface of the specimen inspection stage alone in its home position shown in FIG. 5.

FIG. 7 shows a mechanism providing vertical travel for inspection equipment assembly 408. Microscope 410 features internal LED coaxial illumination that enables use of camera 412. To dissipate energy, the LEDs require a large heat sink 448, which is shown mounted to the front of microscope column 414. The back of microscope column 414 is attached to a paddle-shaped bracket 450, which is in turn attached to linear motor-driven cross-roller stage 452, such as Part No. PRC43AL0025C D3 H2 L1E7, available from Primatics, Inc., Tangent, Oreg. Cross-roller stage 452 raises and lowers microscope 410 along the z-axis. This z-axis motion is counter-balanced by compression springs 454 (only one shown) that are contained in a compression spring housing 456 having slots 457 into which the free ends of a U-shaped spring bar 458 are inserted to constrain its movement. Compression springs 454 resist motion by pushing upward against U-shaped spring bar 458, which is attached to cross-roller stage 452. Counter-balancing the mass of cross roller stage 452 aids in positioning and establishing a rest position for cross roller stage 452, and thereby prevents microscope 410 from striking specimen inspection stage 400 in the event of a power failure.

A harness connector 460 mounted on the top end of cross-roller stage 452 receives at one end a cable terminator 462. Cable terminator 462 indicates where power supply and data transmission wiring that feeds inspection equipment 408 plugs into harness connector 460.

Figure 9:
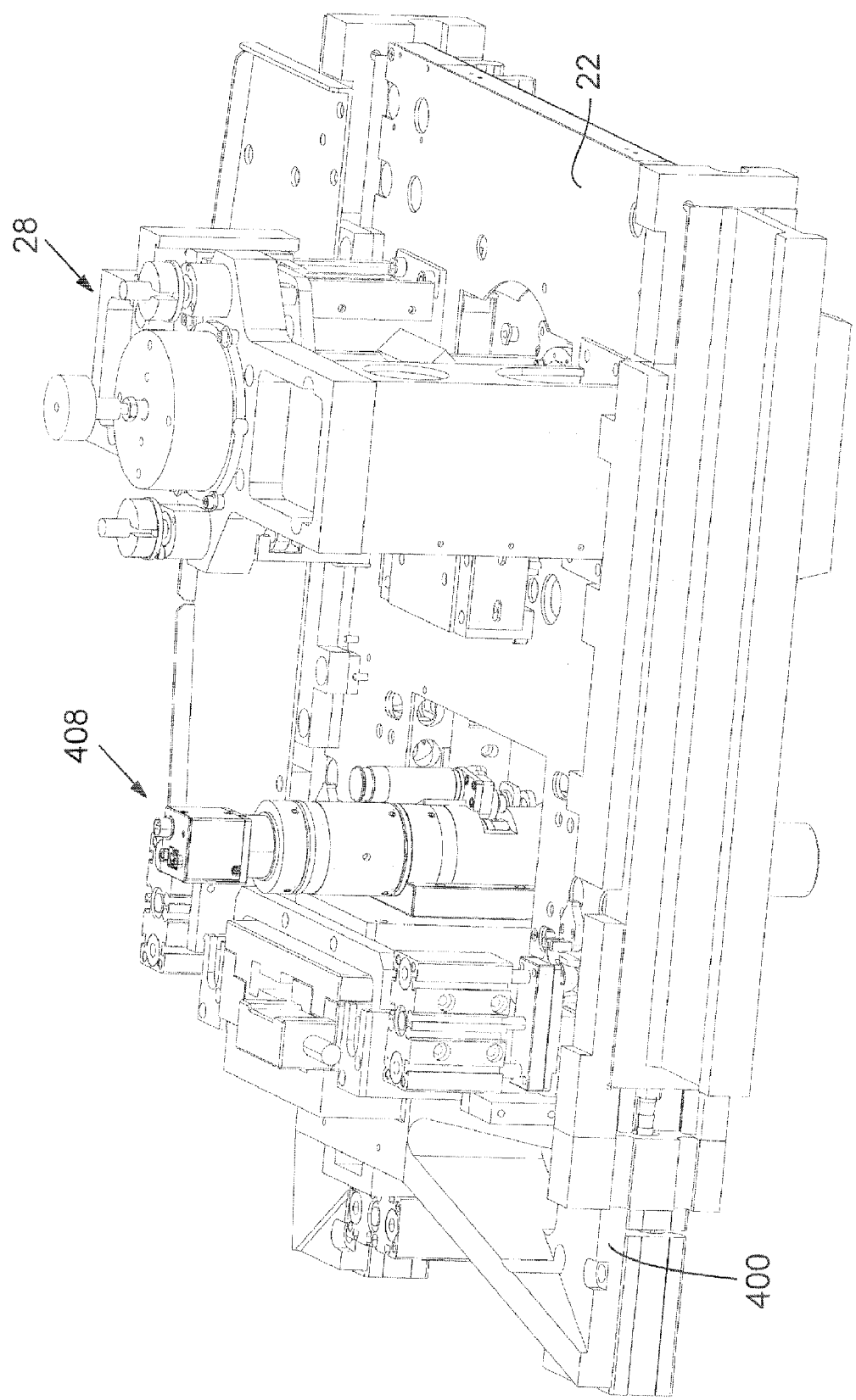
FIG. 9 is an isometric view of the top surface of the specimen inspection stage, shown with its microscope and camera system in place, coupled to the specimen processing stage, shown with a laser optics assembly in place.

FIG. 8 shows specimen inspection stage 400 coupled to optical assembly stage 22, which accommodates inspection equipment 408 via a rectangular cutout 464. FIG. 9 shows a similar view to that of FIG. 8, with laser beam focal region control subsystem 28 in place.

It will be obvious to those having skill in the art that many changes may be made to the details of the above-described embodiments without departing from the underlying principles of the invention. The scope of the present invention should, therefore, be determined only by the following claims.

The invention claimed is:

1. A method of using a laser-based system to process and inspect a specimen, comprising:

providing a specimen processing stage for movement on a substrate on which the specimen is mounted during processing and inspection, the specimen processing stage carrying laser beam propagation path-directing optical components that are movable on the substrate in response to an applied motive force;

providing a specimen inspection stage for movement on the substrate, the specimen inspection stage carrying optical inspection equipment characterized by a substantially large mass and having a home position when parked at rest;

providing a coupling device for releasably coupling the specimen inspection stage and the specimen processing stage to each other;

moving the specimen processing stage to position the laser beam relative to the specimen to process it and, thereafter, to position the coupling device to couple the specimen inspection stage and the specimen processing stage to each other;

moving the coupled specimen processing and inspection stages in tandem to position the optical inspection equipment relative to the specimen to inspect it and, thereafter, to park on the specimen inspection stage at the home position; and uncoupling the specimen processing and inspection stages and, thereafter, moving the specimen processing stage away from the parked specimen inspection stage.

2. The method of claim 1, in which the optical inspection equipment includes a microscope and a camera.

3. The method of claim 1, in which the coupling device is a kinematic mount comprising a ball and a V groove.

4. The method of claim 1, in which the substrate includes a stone slab.

5. The method of claim 4, in which the stone slab is formed of granite.

* * * * *